(12) United States Patent
Tseng et al.

(10) Patent No.: US 10,563,366 B2
(45) Date of Patent: Feb. 18, 2020

(54) DRIVING MECHANISM AND SELF-PROPELLED WARNING DEVICE USING THE SAME

(71) Applicant: HONGFUJIN PRECISION ELECTRONICS (TIANJIN) CO., LTD., Tianjin (CN)

(72) Inventors: Chuang-Wei Tseng, New Taipei (TW); Yu-Ching Chien, New Taipei (TW); Che-Hsun Chen, New Taipei (TW); Chi-Ming Huang, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 371 days.

(21) Appl. No.: 15/636,563

(22) Filed: Jun. 28, 2017

(65) Prior Publication Data

US 2018/0363255 A1 Dec. 20, 2018

(30) Foreign Application Priority Data

Jun. 14, 2017 (CN) .......................... 2017 1 0450300

(51) Int. Cl.
| | |
|---|---|
| *E01F 9/662* | (2016.01) |
| *G05D 1/00* | (2006.01) |
| *B60Q 7/00* | (2006.01) |
| *B62D 39/00* | (2006.01) |
| *E01F 9/688* | (2016.01) |

(Continued)

(52) U.S. Cl.
CPC .............. *E01F 9/662* (2016.02); *B60Q 7/005* (2013.01); *B62D 39/00* (2013.01); *E01F 9/688* (2016.02); *G05D 1/0011* (2013.01); *G09F 19/22* (2013.01); *G09F 21/04* (2013.01); *B60Q 1/52* (2013.01); *E01F 9/692* (2016.02); *G09F 13/16* (2013.01);

(Continued)

(58) Field of Classification Search
CPC .. B60Q 7/00; B60Q 7/005; B60Q 1/52; G09F 13/16; G09F 13/22; G09F 19/22; G09F 21/04; G09F 2013/0472; E01F 9/692; E01F 9/662; E01F 9/688; G05D 1/0011; G08D 1/0955; B62D 39/00
See application file for complete search history.

(56) References Cited

U.S. PATENT DOCUMENTS 4,395,186 A * 7/1983 Whyte .................... A01B 75/00
180/280
4,403,565 A * 9/1983 Bleiweiss .............. B60Q 7/005
116/63 P (Continued)

FOREIGN PATENT DOCUMENTS

TW 201135102 A1 10/2011
TW M536251 U 2/2017

*Primary Examiner* — Jonathan M Dunlap
(74) *Attorney, Agent, or Firm* — ScienBiziP, P.C.

(57) ABSTRACT

A self-propelled warning device used for road safety includes a bracket, a warning sign mounted to an upper side of the bracket, and at least one driving mechanism. The driving mechanism includes a supporting leg, a driving unit, and a wheel. The supporting leg includes a receiving portion, the receiving portion defines an accommodating space. The driving unit is accommodated in the accommodating space. The wheel is mounted on the receiving portion and is drivingly connected to the driving unit. The wheel is driven by friction of the driving unit. The driving mechanism is also disclosed.

15 Claims, 3 Drawing Sheets

(51) Int. Cl.
  *G09F 19/22* (2006.01)
  *G09F 21/04* (2006.01)
  *G09F 13/04* (2006.01)
  *B60Q 1/52* (2006.01)
  *E01F 9/692* (2016.01)
  *G09F 13/16* (2006.01)
  *G09F 13/22* (2006.01)

(52) U.S. Cl.
  CPC ...... *G09F 13/22* (2013.01); *G09F 2013/0472* (2013.01)

(56) References Cited

U.S. PATENT DOCUMENTS

| | | | | |
|---|---|---|---|---|
| 5,330,026 A * | 7/1994 | Hsu | ............ | A63C 17/01 180/181 |
| 7,053,288 B2 * | 5/2006 | Iwai | ............ | A63C 5/06 280/87.042 |
| 7,204,330 B1 * | 4/2007 | Lauren | ............ | A63C 17/12 180/181 |
| 8,505,671 B1 * | 8/2013 | Mohns | ............ | B60K 7/0015 180/305 |
| 9,235,210 B2 * | 1/2016 | Zhang | ............ | G09F 13/16 |
| 9,365,987 B2 * | 6/2016 | Christiansen | ............ | B60P 3/0255 |
| 9,555,315 B2 * | 1/2017 | Aders | ............ | A63C 17/12 |
| 9,878,661 B2 * | 1/2018 | Yang | ............ | B60Q 7/00 |
| 9,902,317 B1 * | 2/2018 | Chuang | ............ | B60Q 1/52 |
| 9,950,243 B2 * | 4/2018 | Evans | ............ | A63C 17/015 |
| 10,131,274 B1 * | 11/2018 | Chien | ............ | G01D 5/145 |
| 10,301,785 B2 * | 5/2019 | Huang | ............ | E01F 9/692 |
| 10,339,413 B2 * | 7/2019 | Huang | ............ | G06K 9/00805 |
| 2006/0170174 A1 * | 8/2006 | Hiramatsu | ............ | A63C 17/0033 280/87.041 |
| 2015/0073623 A1 * | 3/2015 | Zhang | ............ | G09F 13/16 701/2 |
| 2016/0122956 A1 * | 5/2016 | Christiansen | ............ | B60P 3/0255 180/2.2 |
| 2016/0202077 A1 * | 7/2016 | Huang | ............ | G06K 9/52 701/540 |
| 2017/0144056 A1 * | 5/2017 | Evans | ............ | A63C 17/015 |
| 2017/0305337 A1 * | 10/2017 | Yang | ............ | B60Q 7/00 |
| 2019/0024332 A1 * | 1/2019 | Huang | ............ | E01F 9/692 |

* cited by examiner

DRIVING MECHANISM AND SELF-PROPELLED WARNING DEVICE USING THE SAME

FIELD

The subject matter herein generally relates to a driving mechanism and self-propelled warning devices using the driving mechanism.

BACKGROUND

Most rear-end collisions are generally caused by, after a front vehicle involved in an accident or breakdown, advance-warning not being promptly given, which causes the vehicles behind to rear-end the vehicle in front. The rear-end collisions are also caused by the poor visibility and closeness to the accident scene of the warning equipment of the vehicle involved in the accident, the vehicles following do not have sufficient time or distance to respond. Thus, as required by transportation authorities, after a road accident, an advance-warning device must be used to warn the vehicles behind, at a distance of 100-250 meters. However, when a warning device is manually placed, safety of workers would also be threatened by vehicles passing by. Therefore, a warning device that can be self propelled would be beneficial.

BRIEF DESCRIPTION OF THE DRAWINGS

Implementations of the present technology will now be described, by way of example only, with reference to the attached figures.

DETAILED DESCRIPTION

Figure 1:
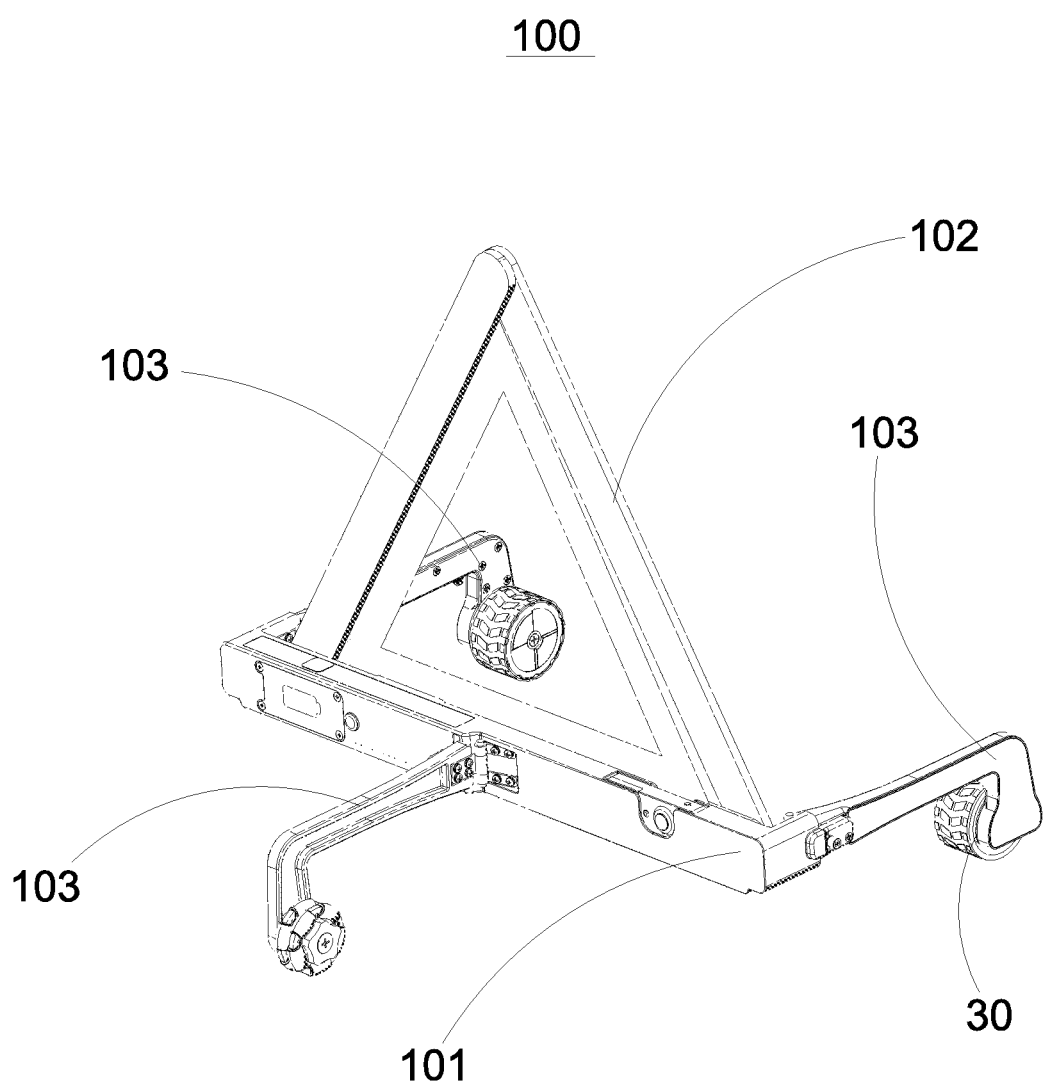
FIG. 1 is an isometric view of an exemplary embodiment of a self-propelled warning device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates a self-propelled warning device 100 in an exemplary embodiment.

The self-propelled warning device 100 includes a bracket 101, a warning sign 102, and at least one driving mechanism 103. The warning sign 102 is mounted to an upper side of the bracket 101. The self-propelled warning device 100 can be self-driven by the driving mechanism 103 coupled to a wheel 30.

Figure 2:
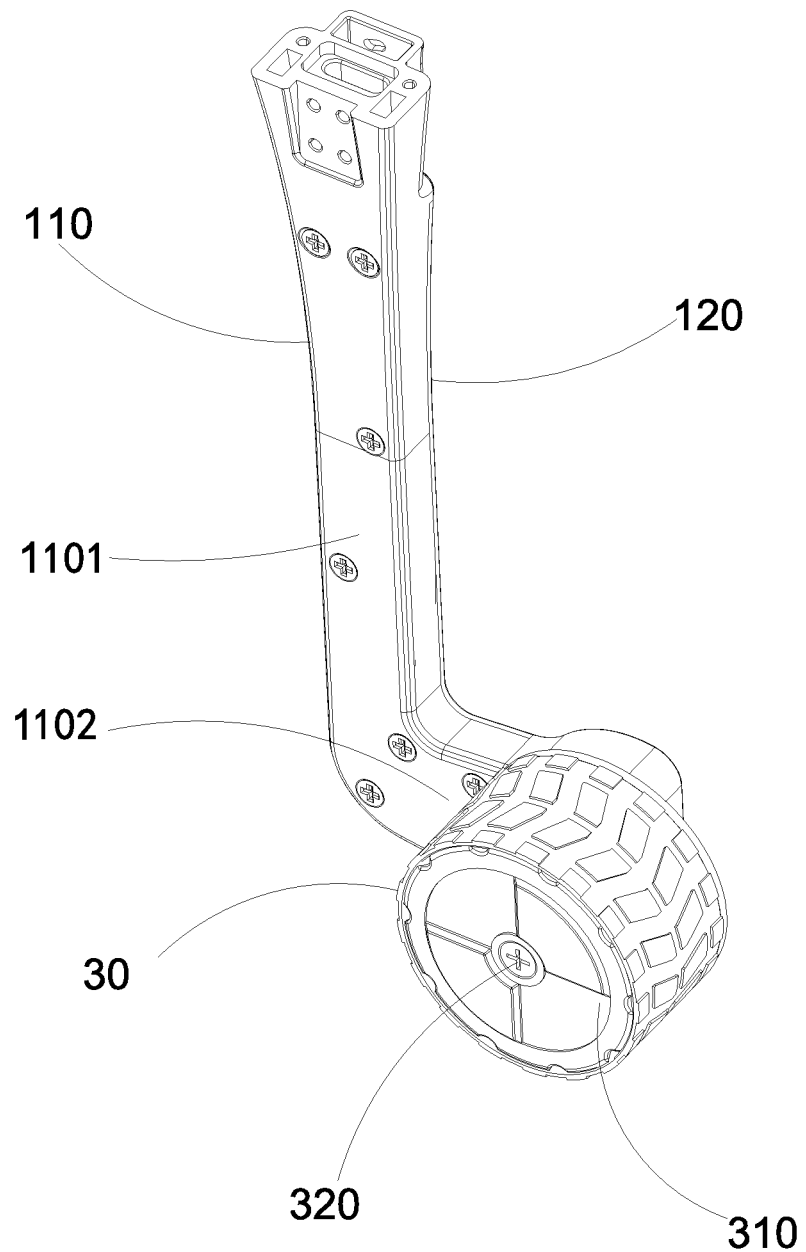
FIG. 2 is an isometric view of the driving mechanism of the device of FIG. 1.
Figure 3:
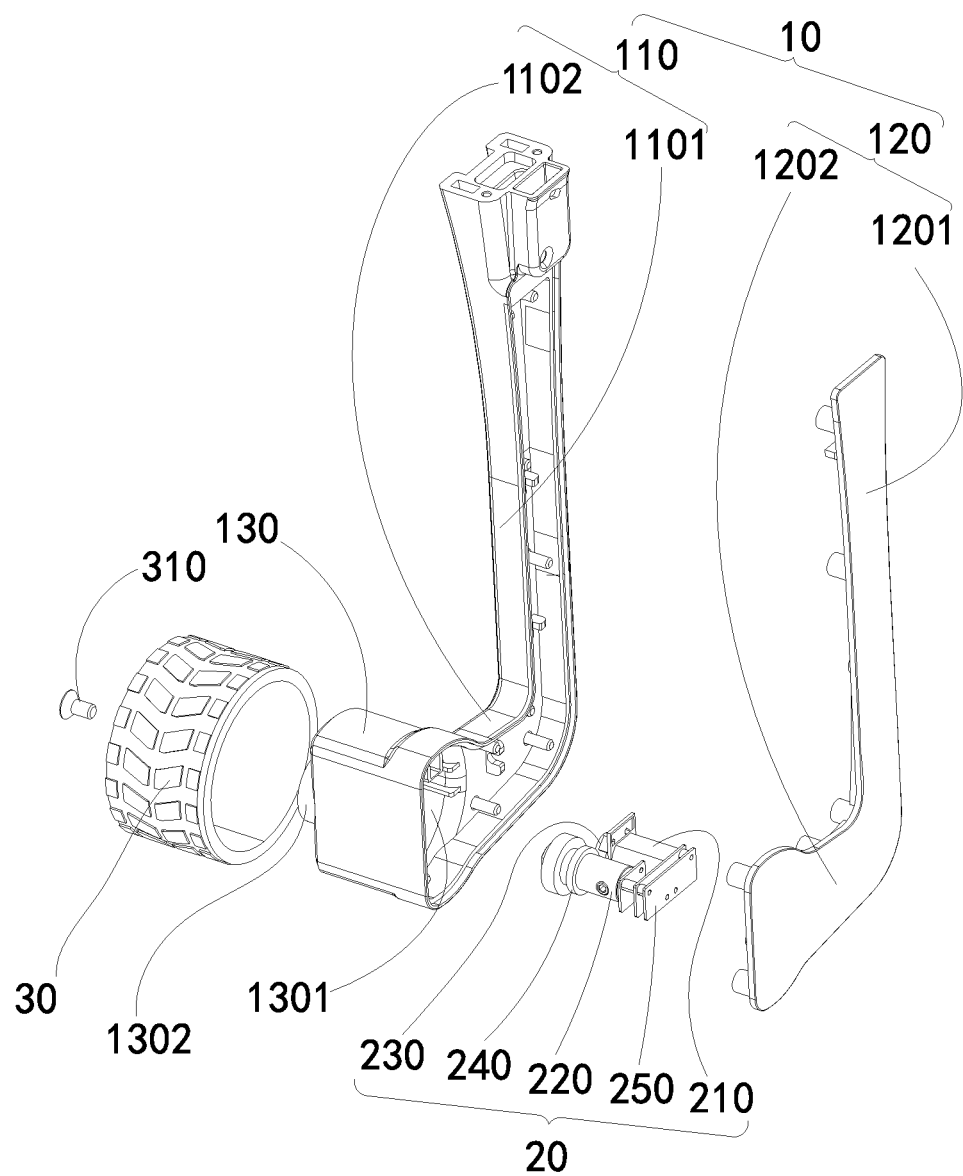
FIG. 3 is an exploded view of the driving mechanism of FIG. 2.

Referring to FIGS. 2 to 3, the driving mechanism 103 can include a supporting leg 10, a driving unit 20, and a wheel 30.

The supporting leg 10 can include a receiving portion 130, the receiving portion defines an accommodating space 1301. The driving unit 20 is accommodated in the accommodating space 1301.

The wheel 30 is sheathed on the receiving portion 130 and is drivingly connected to the driving unit 20. The wheel 30 is driven by the driving unit 20 to rotate around the receiving portion 130.

In at least one exemplary embodiment, the supporting leg 10 can include a connecting portion and a supporting portion perpendicularly connected to the connecting portion, and the receiving portion is defined on the supporting portion.

For example, the supporting leg 10 can include a first fastening member 110 and a second fastening member 120. The second fastening member 120 is coupled with the first fastening member 110. The first fastening member 110 includes a first connecting portion 1101 and a first supporting portion 1102 perpendicularly connected to the first connecting portion 1101. The second fastening member 120 includes a second connecting portion 1201 and a second supporting portion 1202 perpendicularly connected to the second connecting portion 1201. The receiving portion 130 is defined on the first supporting portion 1102.

The driving unit 20 includes a driving motor 210 and a transmitting shaft 220. The transmitting shaft 220 is drivingly connected to the driving motor 210.

The receiving portion 130 defines a shaft hole 1302 corresponding to the transmitting shaft 220. A free end of the transmitting shaft 220 protrudes out of the receiving portion 130 through the shaft hole 1302. The wheel 30 is sheathed on the receiving portion 130 and coaxially connected to the free end of the transmitting shaft 220. The driving motor 210 is an output shaft (not labeled). The transmitting shaft 220 can be coaxially connected to the output shaft of the driving motor 210.

In at least one exemplary embodiment, the driving unit can further include a driving roller 230 and a driven roller 240. The driven roller 240 is coupled with the driving roller 230.

The driving roller 230 is coaxially connected to the output shaft of the driving motor 210. The driven roller 240 is coaxially connected to the transmitting shaft 220. The driving roller 230 and the driven roller 240 are in contact with each other. For example, the driving roller 230 and the driven roller 240 are in tangential contact with each other. The driving roller 230 and the driven roller 240 can be made of elastic materials, so that when the driving roller 230 and the driven roller 240 are in close contact with each other, the driven roller 240 can be driven by the driving roller 230 by friction.

In at least one exemplary embodiment, the radius of the driving roller 230 is smaller than the radius of the driven roller 240, so that the driving roller 230 and the driven roller 240 can be used together as a speed reducer.

The driving unit 20 can further include a holder 250. The driving motor 210 is fixed to the holder, the transmitting shaft 220 is rotatably connected to the holder 250.

Each of a central portion of the wheel 30 and a central portion of the transmitting shaft 220 defines a coaxial screw hole (not shown), the wheel 30 is coaxially connected to the free end of the transmitting shaft 220 through a bolt 320.

In at least one exemplary embodiment, the self-propelled warning device 100 can further include a remote controller (not shown) and a controlling unit (not shown). The controlling unit can communicate with the driving unit 20 and the remote controller.

When the self-propelled warning device 100 is in operation, the remote controller can send controlling signals to the controlling unit, the controlling unit controls the driving unit 20 to switch among working conditions according to the controlling signals, so that the self-propelled warning device 100 can be remotely controlled.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A driving mechanism comprising:
    a supporting leg comprising a receiving portion, wherein the receiving portion defines an accommodating space;
    a driving unit accommodated in the accommodating space; and
    a wheel sheathed on the receiving portion and drivingly connected to the driving unit;
    wherein the wheel is driven by the driving unit to rotate around the receiving portion;
    the driving unit comprises:
        a driving motor; and
        a transmitting shaft drivingly connected to the driving motor;
    wherein the receiving portion defines a shaft hole corresponding to the transmitting shaft, a free end of the transmitting shaft protrudes out of the receiving portion through the shaft hole; the wheel sheathed on the receiving portion and coaxially connected to the free end of the transmitting shaft.

2. The driving mechanism of claim 1, wherein the supporting leg comprises a connecting portion and a supporting portion perpendicularly connected to the connecting portion; and the receiving portion is defined on the supporting portion.

3. The driving mechanism of claim 2, wherein the supporting leg comprises a first fastening member and a second fastening member coupled with the first fastening member; the first fastening member comprises a first connecting portion and a first supporting portion perpendicularly connected to the first connecting portion; the second fastening member comprises a second connecting portion and a second supporting portion perpendicularly connected to the second connecting portion; and the receiving portion is defined on the first supporting portion.

4. The driving mechanism of claim 1, wherein the driving unit further comprises:
    a driving roller; and
    a driven roller coupled with the driving roller;
    wherein the driving motor comprises an output shaft, the driving roller is coaxially connected to the output shaft; the driven roller is coaxially connected to the transmitting shaft, the driving roller and the driven roller are drivingly contact with each other.

5. The driving mechanism of claim 4, wherein the driving roller and the driven roller are in tangential contact with each other.

6. The driving mechanism of claim 1, wherein the driving unit further comprises a holder, the driving motor is fixed to the holder, the transmitting shaft is rotatably connected to the holder.

7. The driving mechanism of claim 1, wherein each of a central portion of the wheel and a central portion of the transmitting shaft defines a screw hole coaxial with each other, the wheel is coaxially connected to the free end of the transmitting shaft through a bolt.

8. A self-propelled warning device comprising:
    a bracket;
    a warning sign mounted to an upper side of the bracket; and
    at least one driving mechanism comprising:
        a supporting leg comprising a receiving portion, wherein the receiving portion defines an accommodating space;
        a driving unit accommodated in the accommodating space; and
        a wheel sheathed on the receiving portion and drivingly connected to the driving unit;
        wherein the wheel is driven by the driving unit to rotate around the receiving portion;
        the driving unit comprises:
            a driving motor; and
            a transmitting shaft drivingly connected to the driving motor;
        wherein the receiving portion defines a shaft hole corresponding to the transmitting shaft, a free end of the transmitting shaft protrudes out of the receiving portion through the shaft hole;
        the wheel sheathed on the receiving portion and coaxially connected to the free end of the transmitting shaft.

9. The self-propelled warning device of claim 8, wherein the supporting leg comprises a connecting portion and a supporting portion perpendicularly connected to the connecting portion; and the receiving portion is defined on the supporting portion.

10. The self-propelled warning device of claim 9, wherein the supporting leg comprises a first fastening member and a second fastening member coupled with the first fastening member; the first fastening member comprises a first connecting portion and a first supporting portion perpendicularly connected to the first connecting portion; the first fastening member comprises a first connecting portion and a first supporting portion perpendicularly connected to the first connecting portion; and the receiving portion is defined on the first supporting portion.

11. The self-propelled warning device of claim 8, wherein the driving unit further comprises:
    a driving roller; and
    a driven roller coupled with the driving roller;
    wherein the driving motor comprises an output shaft, the driving roller is coaxially connected to the output shaft; the driven roller is coaxially connected to the transmitting shaft, the driving roller and the driven roller are drivingly contact with each other.

12. The self-propelled warning device of claim 11, wherein the driving roller and the driven roller are in tangential contact with each other.

13. The self-propelled warning device of claim 8, wherein the driving unit further comprises a holder, the driving motor is fixed to the holder, the transmitting shaft is rotatably connected to the holder.

14. The self-propelled warning device of claim 8, wherein each of a central portion of the wheel and a central portion of the transmitting shaft defines a screw hole coaxial with each other, the wheel is coaxially connected to the free end of the transmitting shaft through a bolt.

15. The self-propelled warning device of claim 8, wherein the self-propelled warning device further comprising:
- a remote controller; and
- a controlling unit communicating with the driving unit and the remote controller;

wherein the remote controller sends controlling signals to the controlling unit, the controlling unit controls the driving unit to switch among working conditions according to the controlling signals.

\* \* \* \* \*